(12) United States Patent
Gkoulalas-Divanis

(10) Patent No.: US 10,915,662 B2
(45) Date of Patent: Feb. 9, 2021

(54) DATA DE-IDENTIFICATION BASED ON DETECTION OF ALLOWABLE CONFIGURATIONS FOR DATA DE-IDENTIFICATION PROCESSES

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 15/843,049

(22) Filed: Dec. 15, 2017

(65) Prior Publication Data

US 2019/0188416 A1 Jun. 20, 2019

(51) Int. Cl.
*G06F 21/00* (2013.01)
*G06F 21/62* (2013.01)
*G06F 21/57* (2013.01)

(52) U.S. Cl.
CPC ........ *G06F 21/6254* (2013.01); *G06F 21/577* (2013.01); *G06F 2221/033* (2013.01)

(58) Field of Classification Search
None
See application file for complete search history.

(56) References Cited

U.S. PATENT DOCUMENTS

| 2005/0038788 A1* | 2/2005 | Dettinger | G06F 21/6227 |
| 2008/0168529 A1* | 7/2008 | Anderson | G06F 21/577 |
| | | | 726/1 |

(Continued)

FOREIGN PATENT DOCUMENTS

CN 104303192 A 1/2015

OTHER PUBLICATIONS

Samarati, Pierangela; Sweeney, Latanya (2018): Protecting privacy when disclosing information: k-anonymity and its enforcement through generalization and suppression. Carnegie Mellon University. Journal contribution. https://doi.org/10.1184/R1/6625469.v1 (Year: 2018).*

(Continued)

*Primary Examiner* — Jeffery L Williams
(74) *Attorney, Agent, or Firm* — Will Stock; Edell, Shapiro & Finnan, LLC

(57) ABSTRACT

A system for de-identifying data determines one or more identifiers that identify an entity of a dataset. One or more data de-identification processes are identified and associated with the determined one or more identifiers. Each data de-identification process is associated with one or more sets of configuration options indicating information to preserve in the dataset. The identified data de-identification processes are executed on the dataset in accordance with the associated sets of configuration options to generate datasets with varying preserved information. The generated datasets are evaluated for privacy vulnerabilities and a data de-identification process and an associated set of configuration options are selected based on the evaluation. The selected data de-identification process is executed on the dataset according to the associated set of configuration options to produce a resulting de-identified data set. Embodiments include a method and computer program product for de-identifying data in substantially the same manner described above.

24 Claims, 8 Drawing Sheets

(56) References Cited

U.S. PATENT DOCUMENTS

| | | | |
|---|---|---|---|
| 2010/0077006 A1* | 3/2010 | El Emam | G06F 21/6254 707/785 |
| 2010/0114840 A1* | 5/2010 | Srivastava | G06F 16/2462 707/688 |
| 2010/0332537 A1* | 12/2010 | El Emam | G06F 16/2457 707/771 |
| 2011/0258206 A1* | 10/2011 | El Emam | G06F 21/577 707/754 |
| 2014/0189858 A1* | 7/2014 | Chen | G06F 21/577 726/22 |
| 2015/0033356 A1* | 1/2015 | Takenouchi | H04L 63/0407 726/26 |
| 2015/0339496 A1* | 11/2015 | El Emam | G06F 21/6254 726/26 |
| 2015/0356591 A1* | 12/2015 | Fano | G06N 20/00 705/14.27 |
| 2016/0342636 A1 | 11/2016 | Braghin et al. | |
| 2016/0342637 A1 | 11/2016 | Braghin et al. | |
| 2017/0103232 A1* | 4/2017 | Scaiano | G06F 21/6254 |
| 2017/0124351 A1* | 5/2017 | Scaiano | G06F 21/6254 |
| 2017/0177907 A1* | 6/2017 | Scaiano | G06F 21/6254 |
| 2017/0220818 A1* | 8/2017 | Nagasundaram | G06F 21/60 |
| 2017/0243028 A1* | 8/2017 | LaFever | G06F 21/6254 |
| 2018/0114037 A1* | 4/2018 | Scaiano | G06F 21/604 |
| 2019/0130115 A1* | 5/2019 | Nagasundaram | G06F 21/60 |
| 2019/0188416 A1* | 6/2019 | Gkoulalas-Divanis | G06F 21/577 |

OTHER PUBLICATIONS

El Emam K, Dankar FK, Issa R, et al. A globally optimal k-anonymity method for the de-identification of health data. J Am Med Inform Assoc. 2009;16(5):670-682. doi:10.1197/jamia.M3144 (Year: 2009).*

P. Samarati, "Protecting respondents identities in microdata release," in IEEE Transactions on Knowledge and Data Engineering, vol. 13, No. 6, pp. 1010-1027, Nov.-Dec. 2001, doi: 10.1109/69.971193. (Year: 2001).*

PCT International Search Report and Written Opinion dated Mar. 20, 2019, PCT/IB2018/059453, 10 pages.

Examination Report in corresponding GB Application No. 2009760. 6, dated Jul. 17, 2020, 5 pages.

El Emam, et al., "Evaluation the Risk of Re-identification of Patients from Hospital Prescription Records", CJHP—vol. 62, No. 4, Jul.-Aug. 2009, 13 pages.

Trabelsi, et al., "Data Disclosure Risk Evaluation", In 2009 Fourth International Conference on Risks and Security of Internet and Systems (CRiSIS 2009), IEEE, 8 pages.

* cited by examiner

| PID | NAME | ADDRESS | BIRTH | ZIP | MARITAL STATUS | ... |
|---|---|---|---|---|---|---|
| 0 | MARIA | 10 NY E. AVENUE | 09/64 | 94139 | DIVORCED | ... |
| 1 | JENNY | 5 BRIGHTON STREET | 09/64 | 94138 | DIVORCED | ... |
| 2 | NICK | 12 DOYLE AVE. | 04/64 | 94138 | WIDOW | ... |
| 3 | TOM | 154 WEST END AV. | 04/64 | 94139 | MARRIED | ... |
| 4 | JOHN | 93 SOMERS STR. | 03/63 | 94139 | MARRIED | ... |
| 5 | BOB | 35 UNIVERSITY AV. | 03/63 | 94138 | MARRIED | ... |

600

| PID | NAME | ADDRESS | BIRTH | GENDER | ZIP | MARITAL STATUS | ... |
|---|---|---|---|---|---|---|---|
| 0 | ANN | 10 NY E. AVENUE | 09/64 | FEMALE | 94139 | DIVORCED | ... |
| 1 | BETTY | 5 BRIGHTON STREET | 09/64 | FEMALE | 94138 | DIVORCED | ... |
| 2 | MIKE | 12 DOYLE AVE. | 04/64 | MALE | 94138 | WIDOW | ... |
| 3 | MARK | 154 WEST END AV. | 04/64 | MALE | 94139 | MARRIED | ... |
| 4 | BILL | 93 SOMERS STR. | 03/63 | MALE | 94139 | MARRIED | ... |
| 5 | ART | 35 UNIVERSITY AV. | 03/63 | MALE | 94138 | MARRIED | ... |

DATA DE-IDENTIFICATION BASED ON DETECTION OF ALLOWABLE CONFIGURATIONS FOR DATA DE-IDENTIFICATION PROCESSES

BACKGROUND

1. Technical Field

Present invention embodiments relate to data access, and more specifically, to de-identifying data based on detection of allowable configurations for data de-identification processes that produce de-identified datasets while maintaining privacy and data utility.

2. Discussion of the Related Art

A privacy-preserving data publishing process consists of a number of steps, including: discovery of direct identifiers; masking of direct identifiers; discovery of quasi-identifiers (QIDs); protection of quasi-identifiers through data anonymization techniques; and data release and reporting. Direct identifiers are attributes that may be used alone to directly and uniquely identify an entity, while quasi-identifiers are groups of attributes that collectively may be used to uniquely identify an entity. Coordination of the different steps in the above process controls whether or not a sufficiently anonymized dataset is rendered.

The protection of direct identifiers in a dataset is performed through data masking operations. These operations transform the original data values to new, fictionalized, data values that may no longer be used for identifying the corresponding entities, while they may also be specially crafted to preserve certain information of the original data values, hence allowing for maintaining a level of data utility in the dataset. For example: an individual name may be masked or replaced with a fictional name that maintains consistency with the gender information for the individual; an electronic mail (email) address may be masked or replaced with another email address that maintains the domain name information of the original email address; a credit card number may be masked or replaced with another credit card number that reflects credit card issuer information of the original credit card number; a telephone and/or fax number may be masked or replaced with another telephone and/or fax number that contains the country code and/or the area code of the original telephone and/or fax number; zip codes, cities, counties, countries, and continents may be masked in a way that maintains spatial proximity to the original location (i.e., geographic correlation to original values); and a date related to an individual may be masked or replaced with another date within the week number and year, the month and year, the quarter and year, or the year of the original date, hence maintaining crucial information that could be very useful for certain types of subsequent data analyses, such as in several medical case studies.

Protection of quasi-identifiers in the dataset is typically performed through data generalization or data suppression operations. Typically, in privacy-preserving data publishing, the protection of direct identifiers and the protection of quasi-identifiers is performed separately. Protection of direct identifiers is performed with minimal or no utility-preservation (e.g., replacement with fictional values that do not maintain any information of the original data values), and is totally based on data expert/data owner decisions. In such cases, a data expert/data owner needs to decide how to mask the direct identifiers in the dataset in a way that the resulting dataset is sufficiently protected against privacy attacks, such as subjects' re-identification, sensitive information disclosures, membership disclosures, inferential disclosures, etc. An issue concerns potential conflicts between utility-preserving options that are selected for the masking of direct identifiers and options selected for the protection of quasi-identifiers through data generalization techniques.

Utility (or information) retained in transformation (or masking) of certain direct identifiers may still allow for a privacy breach, when new values of the direct identifiers are considered together with the generalized (new) values of the quasi-identifiers.

SUMMARY

According to one embodiment of the present invention, a system de-identifies data and comprises at least one processor. The system determines one or more identifiers that identify an entity of a dataset. One or more data de-identification processes are identified and associated with the determined one or more identifiers. Each data de-identification process is associated with one or more sets of configuration options indicating information to preserve in the dataset. The identified data de-identification processes are executed on the dataset in accordance with the associated sets of configuration options to generate datasets with varying preserved information. The generated datasets are evaluated for privacy vulnerabilities and a data de-identification process and an associated set of configuration options are selected based on the evaluation. The selected data de-identification process is executed on the dataset according to the associated set of configuration options to produce a resulting de-identified data set. Embodiments of the present invention further include a method and computer program product for de-identifying data in substantially the same manner described above.

Present invention embodiments reduce processing time by identifying viable and/or optimal configurations for data de-identification processes, rather than employing trial and error approaches to select data de-identification processes for de-identifying data. These trial and error selections are generally based on user knowledge, and may lead to suboptimal data de-identification and numerous data de-identification attempts, thereby wasting processing and other resources.

A present invention embodiment may further generate datasets for evaluation in the form of a table, and consolidate two or more columns of a generated dataset to produce a column with information more specific than the two or more columns. This enables a dataset with more specific information to be evaluated to ensure an absence of a privacy vulnerability. If the generated dataset with more specific information lacks a privacy vulnerability, then other datasets generated from the corresponding data de-identification process and configuration options with more generalized information (e.g., datasets with one or more of the original unconsolidated columns) will also lack a privacy vulnerability. This also reduces processing time by utilizing a single evaluation instead of multiple evaluations for datasets with the more specific and generalized information.

A present invention embodiment may evaluate a generated dataset for privacy vulnerabilities by determining a presence of a link between data for an entity in a generated dataset and data for a known entity in a publicly available dataset to indicate a privacy vulnerability for the generated dataset. This evaluation utilizes the de-identified data from a generated dataset against known entities in a publicly available dataset to determine whether or not identities of entities in the de-identified data can be determined through triangulation attacks, thereby providing significant confidence that a recommended data de-identification process with associated configuration options maintains privacy.

A present invention embodiment may evaluate a generated dataset for privacy vulnerabilities by determining a presence of a set of quasi-identifiers in a generated dataset, introduced by a corresponding data de-identification process and associated set of configuration options, to indicate a privacy vulnerability for the generated dataset. This evaluation that is based on uniqueness criteria, and ensures that quasi-identifiers are not introduced by a data de-identification process and associated configuration options, thereby providing significant confidence that a recommended data de-identification process with associated configuration options maintains privacy. If the generated dataset does not contain any uniques or outliers, it cannot be linked through triangulation attacks to any other (internal or external) datasets, hence it maintains privacy.

A present invention embodiment may reduce processing time for the de-identification of the original dataset, by identifying a generated dataset lacking privacy vulnerabilities and terminating processing with respect to other associated sets of configuration options for a corresponding data de-identification process generating a dataset with more generalized information than the identified generated dataset. This significantly improves performance of the processors and provides an optimal data de-identification in a reduced amount of processing time.

BRIEF DESCRIPTION OF THE DRAWINGS

Generally, like reference numerals in the various figures are utilized to designate like components.

FIG. 6 is an example dataset generated by a data de-identification process configured for de-identifying a name attribute while preserving gender information.

DETAILED DESCRIPTION

Figure 1:
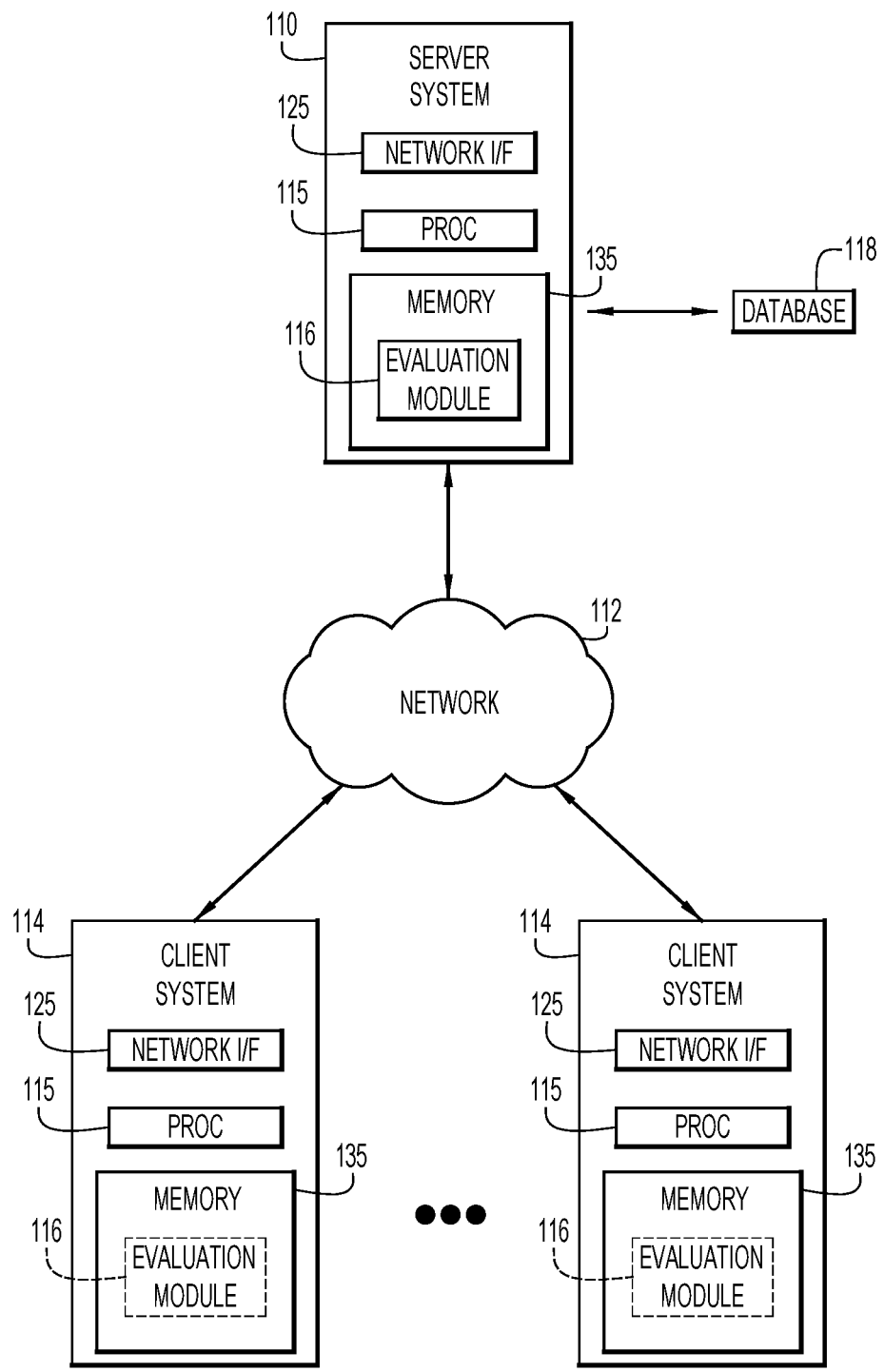
FIG. 1 is a diagrammatic illustration of an example computing environment of an embodiment of the present invention.

Present invention embodiments evaluate the privacy risk of each available set of configuration options of a data de-identification process or technique, and enable only those configuration options (or settings) to be used that block privacy vulnerabilities in the data. Present invention embodiments analyze a dataset to discover and report permissible configuration options (or settings) for data de-identification processes or techniques to perform data anonymization. The configuration options or settings typically indicate data to be de-identified and corresponding information in the data to be preserved by the de-identified values. By way of example, a present invention embodiment may detect configuration options for data masking processes or techniques for direct identifiers of a dataset. However, any data de-identification or anonymization processes or techniques may be evaluated for any types of identifiers in substantially the same manner described below.

Trial and error approaches are typically employed by existing approaches to select data de-identification processes for de-identifying data. These selections are generally based on user knowledge, and may lead to sub-optimal data de-identification and numerous data de-identification attempts, thereby wasting processing and other resources. Present invention embodiments reduce processing time by identifying allowable and/or optimal configurations for data de-identification processes for rapid de-identification of data in a maximal utility-preserving way.

According to one embodiment of the present invention, one or more identifiers (attributes) are determined that identify an entity of a dataset. One or more data de-identification processes are identified and associated with the determined one or more identifiers. Each data de-identification process is associated with one or more sets of (utility-preserving) configuration options indicating information to preserve. For each identifier in the dataset, a data de-identification process with a utility-preserving configuration is selected. The special case of completely suppressing the identifier is considered among the data de-identification processes for the identifier. The selected data de-identification processes are executed on the dataset in accordance with the associated sets of configuration options to generate a dataset with varying preserved data utility. Subsequently, a different data de-identification process with a utility-preserving configuration is selected for at least one identifier and the newly selected data de-identification processes are executed on the dataset in accordance with the associated set of configuration options to generate a new dataset with varying preserved data utility. The same operation repeats until all possible combinations of the different data de-identification processes and their associated configuration options, for the determined one or more identifiers that identify an entity of the dataset, have been executed on the dataset to generate datasets with varying preserved data utility. Each generated dataset is evaluated for privacy vulnerabilities and one or more data de-identification processes and associated sets of configuration options are selected based on the evaluation. Among the selected data de-identification processes, the one achieving lowest re-identification risk and highest data utility is executed on the dataset according to the associated set of configuration options to produce a resulting de-identified data set.

A present invention embodiment may further generate datasets for evaluation in the form of a table, and consolidate two or more columns of a generated dataset to produce a column with information more specific than the two or more columns. This enables a dataset with more specific information to be evaluated to ensure an absence of a privacy vulnerability. If the generated dataset with more specific information lacks a privacy vulnerability, then other datasets generated from the corresponding data de-identification process and configuration options with more generalized information (e.g., datasets with one or more of the original unconsolidated columns) will also lack a privacy vulnerability. This also reduces processing time by utilizing a single evaluation instead of multiple evaluations for datasets with the more specific and generalized information.

Moreover, a present invention embodiment may evaluate a generated dataset for privacy vulnerabilities by determining a presence of a link between data for an entity in a generated dataset and data for a known entity in a publicly available dataset to indicate a privacy vulnerability for the generated dataset. This evaluation utilizes the de-identified data from a generated dataset against known entities in a publicly available dataset to determine whether or not identities of entities in the de-identified data can be determined, thereby providing significant confidence that a recommended data de-identification process with associated configuration options maintains privacy.

A present invention embodiment may further evaluate a generated dataset for privacy vulnerabilities by determining a presence of a set of quasi-identifiers in a generated dataset introduced by a corresponding data de-identification process and associated set of configuration options to indicate a privacy vulnerability for the generated dataset. This evaluation ensures that quasi-identifiers are not introduced by a data de-identification process and associated configuration options, thereby providing significant confidence that a recommended data de-identification process with associated configuration options maintains privacy.

In addition, a present invention embodiment may reduce processing time for the de-identification by identifying a generated dataset lacking privacy vulnerabilities and terminating processing with respect to other associated sets of configuration options for a corresponding data de-identification process generating a dataset with more generalized information than the identified generated dataset. This significantly improves performance of the processors and provides an optimal data de-identification in a reduced amount of processing time.

An example environment for use with present invention embodiments is illustrated in FIG. 1. Specifically, the environment includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with server systems 110 to perform desired actions, such as data de-identification. The server systems include an evaluation module 116 to detect allowable configurations or settings for various data de-identification processes or techniques to produce resulting datasets that maintain data privacy. A database system 118 may store various information for the analysis (e.g., original and interim datasets, configurations or settings, options for data de-identification processes, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the analysis, and may provide reports including analysis results (e.g., recommended data de-identification processes, de-identified datasets, options used to de-identify datasets, etc.).

Server systems 110 and client systems 114 may be implemented by any conventional or other computer systems preferably equipped with a display or monitor, a base, optional input devices (e.g., a keyboard, mouse or other input device), and any commercially available and custom software (e.g., server/communications software, evaluation module, browser/interface software, data de-identification processes, etc.). The base preferably includes at least one hardware processor 115 (e.g., microprocessor, controller, central processing unit (CPU), etc.), one or more memories 135 and/or internal or external network interfaces or communications devices 125 (e.g., modem, network cards, etc.)).

Alternatively, one or more client systems 114 may detect allowable configurations or settings for various data de-identification processes or techniques when operating as a stand-alone unit. In a stand-alone mode of operation, the client system stores or has access to the data (e.g., datasets, configurations or settings, data de-identification processes, etc.), and includes evaluation module 116 to perform the detection. The graphical user (e.g., GUI, etc.) or other interface (e.g., command line prompts, menu screens, etc.) solicits information from a corresponding user pertaining to the analysis, and may provide reports including analysis results.

Evaluation module 116 may include one or more modules or units to perform the various functions of present invention embodiments described below. The various modules (e.g., evaluation module, etc.) may be implemented by any combination of any quantity of software and/or hardware modules or units, and may reside within memory 135 of the server and/or client systems for execution by processor 115.

Figure 2:
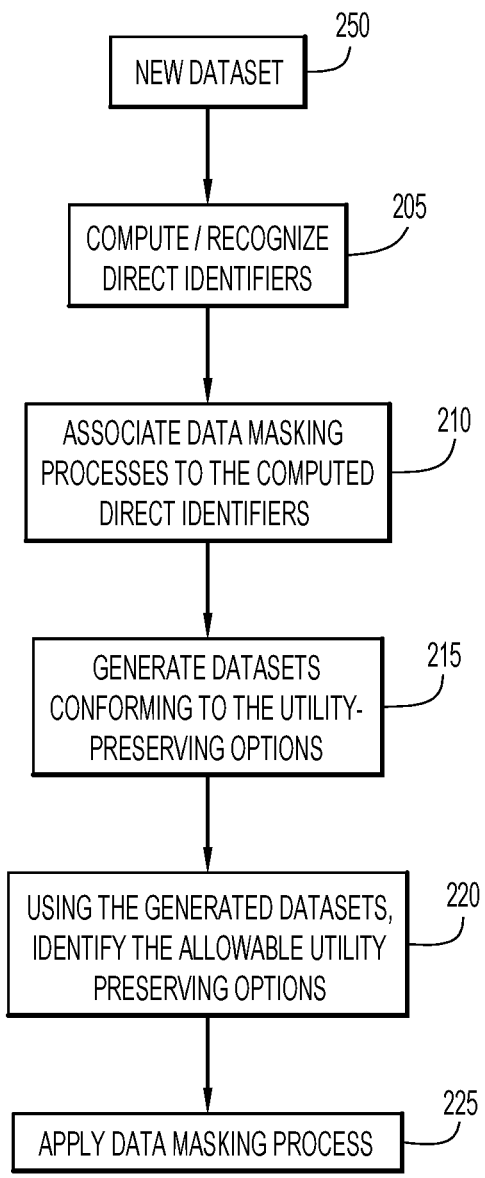
FIG. 2 is a procedural flowchart illustrating a manner of detecting allowable configuration options for data de-identification processes to produce datasets maintaining data privacy according to an embodiment of the present invention.

A manner of detecting allowable configuration options or settings for data de-identification processes or techniques (e.g., via evaluation module 116 and a server system 110 and/or client system 114) to produce datasets maintaining data privacy according to an embodiment of the present invention is illustrated in FIG. 2. Initially, each data de-identification process is associated with certain data types and operates in accordance with various configuration options or settings. The configuration options or settings typically indicate data to be de-identified and corresponding information in the data to be preserved by the de-identified values. For example, a configuration option specifying a name to be de-identified while preserving gender information produces a dataset with the names replaced with fictionalized names consistent with the original gender information (e.g., a female name is replaced with a fictionalized female name to preserve or maintain consistency with the gender information for the original name, etc.). In addition, the configuration options may specify that certain data are to be deleted from a resulting dataset.

A template is generated for each set of configuration options associated with a data de-identification process. Each set of configuration options may include one or more configuration options for the data de-identification process. Thus, each data de-identification process (available on the server and/or client systems) is associated with a series of templates with each template corresponding to one of the possible sets of configuration options for that data de-identification process (e.g., data to be deleted, data to be de-identified while preserving other data, data to be de-identified while preserving certain properties such as spatial proximity, etc.). Basically, the series of templates for each data de-identification process covers all possible configurations for that data de-identification process with respect to associated attributes or identifiers. The template captures information that is retained in the dataset when an original attribute is processed by an associated data de-identification process according to the corresponding configuration options.

For example, the templates for a data de-identification process with respect to name, telephone number, and address attributes may include: name templates (e.g., template (name, delete), where the name attribute is to be deleted; template (name, gender), where the name attribute is replaced with values that preserve or maintain consistency with gender information); telephone templates (e.g., template (phone, delete), where the telephone number attribute is to be deleted; template (phone, country), template (phone, country and area), where the telephone number attribute is replaced with values that respectively preserve or maintain consistency with the country, and the country and area code, respectively); address templates (e.g., template (address, delete) where the address attribute is to be deleted; template (address, country), template (address, country and city), template (address, minimum bounding rectangle (MBR)), where the address attribute is replaced with values that respectively preserve or maintain consistency with the country, city, and local area within a prescribed distance). However, the templates may pertain to any desired options for deleting or preserving any attributes (e.g., address, telephone number, vehicle identification number (VIN), social security number (SSN), country, uniform resource locator (URL), name, IP address, electronic mail (email) address, credit card number, international bank account number (IBAN), date, city, medical ICD code, occupation, hospital, latitude/longitude, zip code, etc.). With respect to data privacy and data utility preservation, a template captures the truthful information that is maintained in the dataset after de-identification. For a template (attribute A, options B), this represents the replacement of attribute A in the dataset with the (utility-preserving) information provided in options B. For example, template (name, gender) can be translated as replace the name attribute in the dataset with a gender attribute capturing accurate gender information about the individuals in the data. Similarly, template (phone, country and area) can be translated as replace the phone attribute in the dataset with an attribute maintaining accurate country information and an attribute maintaining accurate area information for the individuals represented in the dataset. The use of templates provides information about what has been retained in the data which, subsequently, can be used to calculate privacy risk and data utility in the resulting dataset.

In addition, a template may indicate one or more attributes to delete or de-identify, and/or one or more attributes to preserve. For example, a series of templates may include initial templates each specifying an attribute to delete or de-identify according to configuration options. Additional templates may specify configuration options of the initial templates or attributes, and include further configuration options with respect to a second attribute (e.g., providing de-identification of two attributes). Thus, the templates for a data de-identification process may cover all or any portion of the various combinations of de-identification provided by the data de-identification process for corresponding attributes of a dataset.

By way of example, a present invention embodiment is described with respect to detecting configuration options for data de-identification processes in the form of data masking processes or techniques for direct identifiers of a dataset. However, any data de-identification or anonymization processes or techniques may be evaluated for any types of identifiers in substantially the same manner described below.

Specifically, a dataset 250 is received and analyzed to detect direct identifiers for data masking at step 205. Direct identifiers are attributes that may be used to directly identify an entity (e.g., name, social security number, address, phone number, etc.). The dataset is preferably in the form of a table with each row representing an entity, and each column representing an attribute of that entity (e.g., name, address, gender, etc.). However, the dataset may be in any desired format. The direct identifiers may be detected using any conventional or other techniques. For example, uniqueness of attributes with respect to an entity may be used to detect direct identifiers in dataset 250. Alternatively, regular expressions or patterns may be used to identify certain types of data in the dataset known to be direct identifiers (e.g., social security number, address, dates, etc.). Alternatively, look up tables may be used to identify certain types of direct identifiers, such as names (e.g., through voter registration lists). In addition, direct identifiers for a dataset may be manually pre-determined by a user.

Data masking processes corresponding to the detected direct identifiers are identified at step 210. The data masking processes are typically compatible with certain types of data or attributes, and each detected direct identifier is associated with each of the corresponding compatible data masking processes for evaluation.

The data masking processes are applied to corresponding direct identifiers according to templates (described above) specifying the various sets of configuration options for the data masking processes at step 215. This generates a dataset for each set of configuration options for each data masking process associated with the direct identifiers. The generated datasets are preferably in the form of a table of rows and columns (or attributes), but may be in any desired format. For example, FIG. 6 illustrates an initial dataset 600 in the form of a table with each row representing an individual, and columns or attributes for each individual of name, address, birth date, zip code, and marital status. A data masking process may enable the name attribute to be masked with a fictionalized name that preserves or maintains consistency with the gender attribute. In this case, a template for the data masking process may specify the corresponding set of configuration options (e.g., template (name, gender)).

When the data masking process is applied according to this set of configuration options, a dataset 620 is generated with the names of the individuals masked with fictionalized names that preserve or maintain consistency with the gender attribute. Effectively, this results in a dataset 620 where a new gender attribute appears that contains accurate gender information computed from the original dataset 600. In this case, male names in dataset 600 have been replaced with different male names in dataset 620 to maintain the gender information. Similarly, female names in dataset 600 have been replaced with different female names in dataset 620 to preserve the gender information. This effectively replaces the name attribute or column with the gender column with respect to assessing privacy vulnerabilities (since the fictionalized names only identify the gender of the individual and cannot be used for any other purpose that would increase privacy risk in the data).

Figure 7:
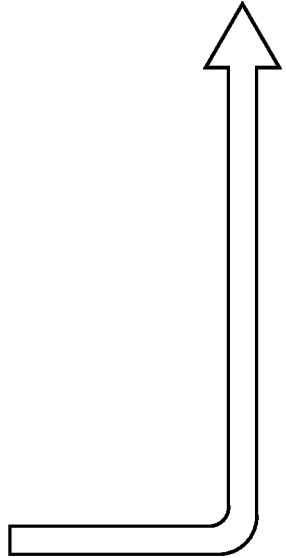
FIG. 7 is an example dataset generated by a data de-identification process configured for de-identifying an address attribute while preserving spatial proximity.

By way of further example, FIG. 7 illustrates an initial dataset 700 in the form of a table with each row representing an individual and columns or attributes for each individual of name, address, birth date, zip code, and marital status. A data masking process may enable the address attribute to be masked with another address within a two mile minimum bounded rectangle (MBR). In this case, a template for the data masking process may specify the corresponding set of configuration options (e.g., template (address, minimum bounding rectangle (MBR)).

When the data masking process is applied according to this set of configuration options, a dataset 720 is generated with the addresses of the individuals changed or masked to different addresses that lie within the two mile minimum bounding rectangle (MBR). However, the new addresses in combination with the zip code may form a quasi-identifier and create a privacy vulnerability for this set of configuration options. Thus, in the generated dataset 720 one needs to combine the address and the zip code attributes to get as much specificity as possible regarding the location of the individual (e.g., home address). Then, use this information to assess privacy risk of releasing the data.

Referring back to FIG. 2, the generated datasets from the templates are evaluated to identify allowable data masking processes and corresponding sets of configuration options to produce resulting datasets maintaining data privacy at step 220. The evaluation analyzes a generated dataset for linkages to publicly available or external datasets (e.g., voter registration lists, yellow pages, census data, etc.). When a linkage exists (e.g., when a triangulation attack with the external dataset is successful), this indicates that an identity of an individual of the generated (or masked) dataset may be determined, thereby identifying a privacy vulnerability with respect to the data masking process and corresponding set of configuration options used to generate the dataset. In addition, the generated dataset may be analyzed to determine the presence of quasi-identifiers introduced into the generated dataset based on the data masking process and corresponding set of configuration options. The presence of a quasi-identifier indicates a privacy vulnerability with respect to the data masking process and corresponding set of configuration options used to generate the dataset.

A resulting data masking process and corresponding set of configuration options may be selected from among the identified allowable data masking processes (and corresponding sets of configuration options). The resulting data masking process may be selected manually by a user. In this case, the allowable data masking processes and associated sets of configuration options may be presented to a user on a client system 114 for selection. Recommendations for the allowable data masking processes may also be provided. The recommendations may be based on various metrics (e.g., privacy levels, processing times, data preservation, etc.).

Alternatively, the resulting data masking process may be determined automatically. Various metrics may be utilized to determine the resulting data masking process. For example, the data masking process may be selected that provides the most data privacy based on linkages to publicly available datasets and/or introduction of the least quantity of quasi-identifiers. Alternatively, the data masking process may be selected based on the least amount of resource usage and/or processing time to reduce processing time for de-identification of the dataset.

In addition, the resulting data masking process may be recommended or automatically selected based on machine learning. In this case, data masking processes and associated sets of configuration options selected by a user may be stored, and/or metrics may be tracked. This information may be processed to learn user preferences for selections and/or recommendations. Various models may be employed to perform the learning (e.g., neural networks, mathematical/ statistical models, classifiers, etc.). For example, a masking process may be initially recommended and/or selected. However, for some reasons, a user repeatedly preferred another allowable data masking process. These aspects and preferences for users may be learned (e.g., a user may prefer faster processing times over greater privacy levels, etc.) and employed to select and/or recommend data masking processes.

The resulting data masking process is applied to (or executed on) dataset 250 in accordance with the corresponding set of configuration options to de-identify the dataset at step 225 while maintaining data privacy.

Figure 3:
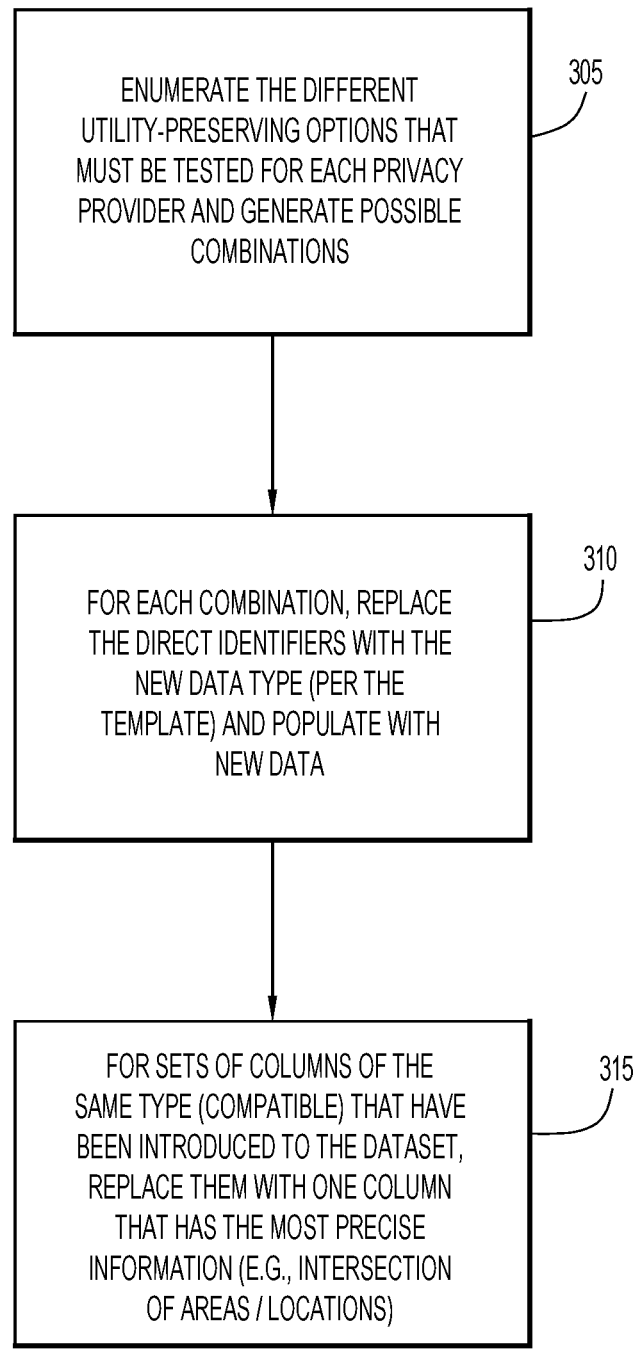
FIG. 3 is a procedural flowchart of a manner of generating datasets in accordance with configuration options of data de-identification processes according to an embodiment of the present invention.

A manner of applying the templates for the data masking processes to generate datasets for evaluation (e.g., corresponding to step 215 of FIG. 2) according to an embodiment of the present invention is illustrated in FIG. 3. Initially, a series of data masking processes and corresponding sets of configuration options are used to generate datasets that are tested for introduction of potential privacy risks. In particular, different sets of configuration options for each data masking process associated with the detected direct identifiers are determined at step 305. A dataset is generated for each determined set of configuration options for each data masking process at step 310. This may be accomplished by applying a template specifying a set of configuration options to a data masking process to generate a dataset. In other words, the data masking process is executed in accordance with the set of configuration options of the template to delete or mask an associated direct identifier. The generated dataset is preferably in the form of a table with rows and columns (or attributes), but may be in any desired format.

Attributes or columns in a generated dataset that are of the same or compatible types may be consolidated at step 315 to provide a column in the generated dataset with more precise or specific information. For example, a consolidated column may be an intersection of areas or locations in the initial columns being consolidated. By way of example, columns that respectively contain zip codes and a minimum bounding rectangle (MBR) of addresses may be replaced with a single column having the more precise information with respect to location. In this case, when the MBR covers a greater area than the zip codes, the zip code column may remain in the generated dataset as providing more specific information with respect to a location (e.g., the zip codes cover a smaller area than the MBR). This provides a generated dataset with more specific information (or a scenario more susceptible to privacy vulnerabilities) to be tested for privacy vulnerabilities. If the more specific information does not raise privacy concerns, then any generalized or broader information would similarly not raise privacy concerns.

The generated datasets for each of the data masking processes and associated sets of configuration options are evaluated for privacy vulnerabilities.

Figure 4:
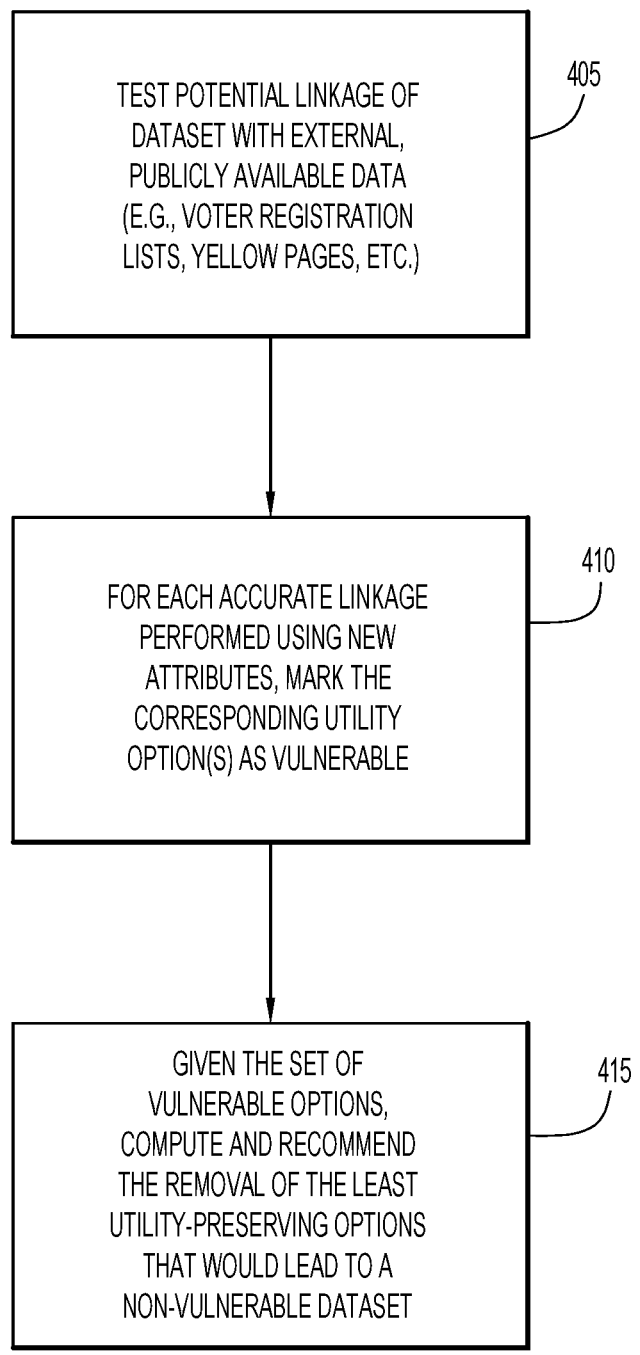
FIG. 4 is a procedural flowchart of a manner of evaluating configuration options for data de-identification processes based on publicly available data according to an embodiment of the present invention.

A manner of detecting privacy vulnerabilities for the generated datasets (e.g., corresponding to step 220 of FIG. 2) based on publicly available data is illustrated in FIG. 4. Initially, each dataset generated from a data masking process and corresponding template specifying a set of configuration options is evaluated for privacy vulnerabilities. This is accomplished by linking data in the generated dataset with external or publicly available data. Specifically, data within each generated dataset is tested for potential linkage with external or publicly available data (e.g., voter registration lists, yellow pages, census data, etc.) at step 405. In other words, data for an entity in a generated dataset is utilized to determine a link to data of a corresponding known entity in the publicly available data. For example, one or more attribute values for an entity in the generated dataset may be used to find corresponding attribute values in the publicly available data.

When a link exists (e.g., a sufficient quantity or pattern of attributes match), this indicates that the entity data of the generated dataset corresponds to the known entity in the publicly available data, thereby enabling identification of the entity from the generated dataset. A quantity of links between entities of a generated dataset and the publicly available data may be maintained and compared to a threshold to determine the presence of a privacy vulnerability for the generated dataset (and the data masking process and set of configuration options used to produce the generated dataset) at flow 410. The threshold may be set to any desired values, where the quantity of links may be compared to the threshold in any desired manner to indicate a privacy vulnerability (e.g., greater than, less than, greater than or equal to, less than or equal to, etc.). By way of example, the threshold may be set to zero, and a generated dataset may be considered to have a privacy vulnerability in response to the presence of one or more links between entities of the generated dataset and known entities of the publicly available data. The data masking processes and associated sets of configuration options used to produce generated datasets with privacy vulnerabilities are marked for determining recommendations and/or selections.

Once each of the generated datasets have been tested against the external or publicly available data, the data masking processes and associated sets of configuration options used to produce generated datasets with privacy vulnerabilities are marked and removed from further consideration. The remaining data masking processes and associated sets of configuration options are analyzed to determine a recommended set of data masking processes and associated set of configuration options to provide a non-vulnerable dataset at step 415. The recommended set may be reduced by removing data masking processes with associated sets of configuration options having lesser preservation. In addition, when no data masking processes and associated sets of configuration options provide a dataset without privacy vulnerability, the data masking process and associated set of configuration options with the least privacy vulnerabilities (e.g., or quantity of links) may be recommended. The recommended data masking processes may be presented to a user for selection, or a data masking process may be automatically selected as described above.

Figure 5:
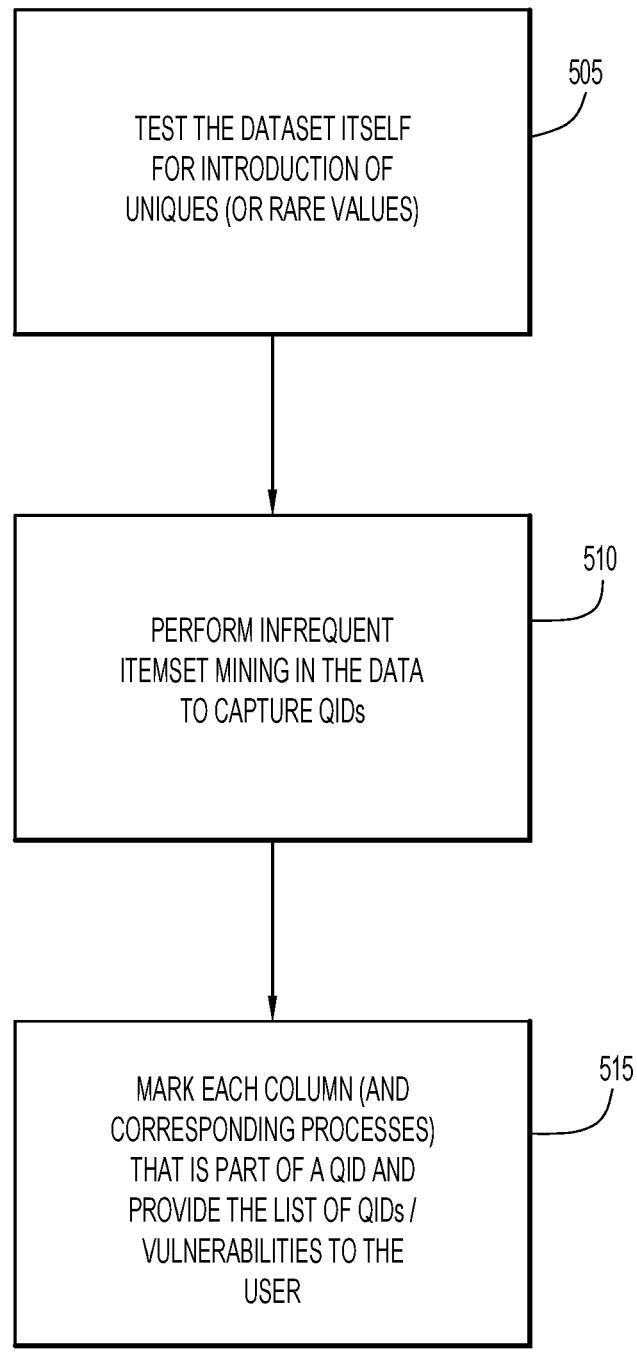
FIG. 5 is a procedural flowchart of a manner of evaluating configuration options for data de-identification processes based on introduction of quasi-identifiers within de-identified data according to an embodiment of the present invention.

In addition, privacy vulnerabilities for generated datasets may be determined based on analysis of the generated datasets (e.g., corresponding to step 220 of FIG. 2) as illustrated in FIG. 5. Initially, each generated dataset is examined for introduction of rare or unique values at step 505. Each generated dataset is further mined to capture any quasi-identifiers that may have arisen based on the data masking process and corresponding set of configuration options at step 510. The quasi-identifiers may be identified in a generated dataset based on any conventional or other techniques. For example, uniqueness of entities identified by groups of attributes within the generated dataset may be utilized to determine quasi-identifiers, regular expressions or patterns may be used to identify known quasi-identifiers, etc. In addition, a user may specify quasi-identifiers from original data columns and/or consolidated columns (e.g., columns created based on consolidating columns of a same type (or generated in accordance with compatible templates)).

Each column of a generated dataset that is identified as a component of a quasi-identifier is marked as having a privacy vulnerability for determining recommendations and/or selections. In other words, the data masking process and corresponding set of configuration options used to produce the generated dataset have introduced a quasi-identifier into the generated data set. The identified quasi-identifiers and privacy vulnerabilities are provided for presentation on client system 114 at step 515.

The evaluation of the generated datasets for data linkages and quasi-identifiers may be performed in any order, and may further be performed in parallel to enhance processing performance. In addition, results of these evaluations may be combined in any manner to determine the presence of a privacy vulnerability within a generated dataset. For example, a privacy vulnerability may exist for a generated dataset in response to a certain quantity of links and a certain number of quasi-identifiers. Alternatively, a privacy vulnerability may be determined to exist in response to either a certain quantity of data links or a certain number of quasi-identifiers. In this case, when one of these conditions occurs, the generated dataset is considered to have privacy vulnerabilities and additional processing or evaluation for other conditions may be terminated which reduces processing time.

Generating and evaluating datasets for data de-identification processes or techniques with numerous sets of associated configuration options may require significant processing time. In order to enhance processing performance and reduce processing time for de-identifying data, present invention embodiments may employ several techniques. For example, various data de-identification processes and associated sets of configuration options may be provided by a user and evaluated. When one or more of these data de-identification process configurations produce a dataset with no privacy vulnerabilities, generation and evaluation of datasets produced by remaining data de-identification processes and associated configurations may be terminated, thereby reducing processing time and preserving computing resources. Further, limits may be provided indicating a quantity of configurations for data de-identification processes to evaluate.

Figure 8:
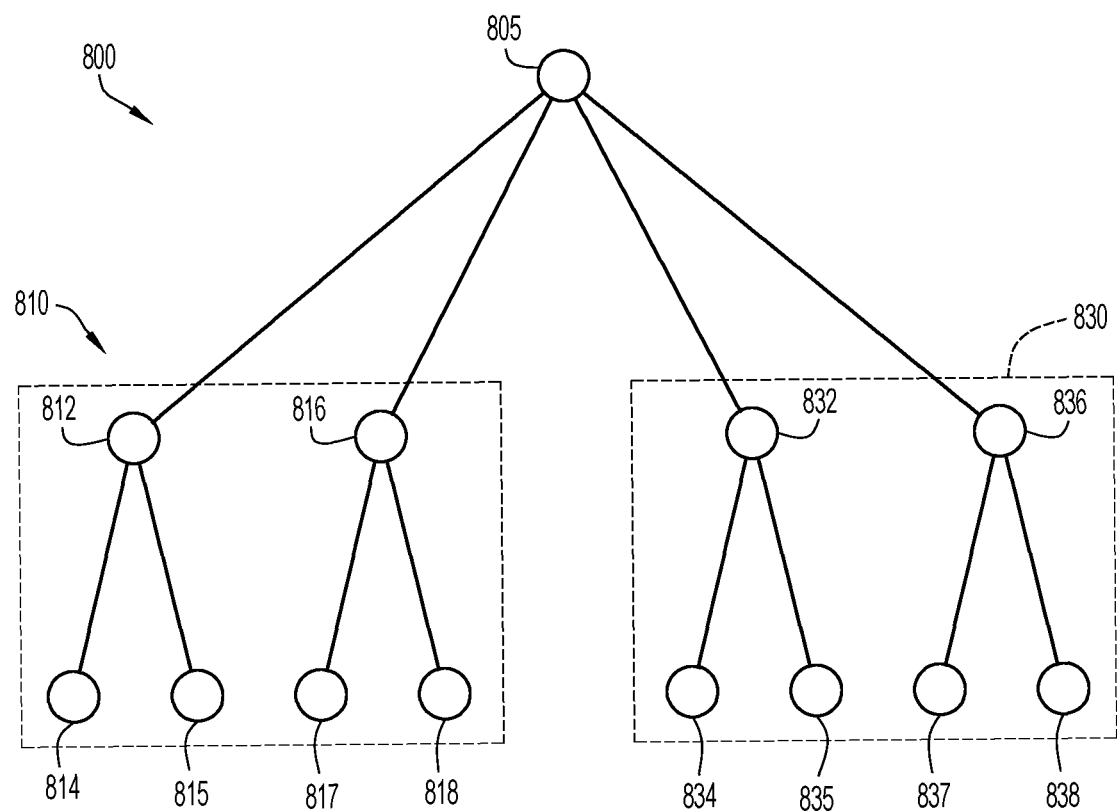
FIG. 8 is a diagrammatic illustration of an example tree structure utilized for controlling processing of data de-identification processes to reduce processing time according to an embodiment of the present invention.

In addition, a tree or other data structure may be created to control the generation and evaluation of datasets produced by data de-identification processes and associated sets of configuration options, thereby enhancing computing performance and reducing processing time. An example data structure in the form of a tree structure is illustrated in FIG. 8. By way of example, tree structure 800 represents the sets of configuration options for a de-identification process with two configuration options (e.g., a delete option and a de-identify with data preservation option) for each of two attributes (e.g., name and address). However, the tree structure may represent any quantity of configuration options for any de-identification process with respect to any quantity of any attributes.

Tree structure 800 includes a root node 805 and sub-trees 810 and 830. Each node represents a corresponding set of configuration options for the data de-identification process, and is associated with a corresponding template. For example, node 812 of sub-tree 810 may represent a first set of configuration options for a first attribute (e.g., delete name), while node 816 may represent a second set of configuration options for the first attribute (e.g., de-identify name while preserving gender information). Children nodes 814, 815 of node 812 may each represent the set of configuration options of node 812 as well as respective sets of configuration options for a second attribute (e.g., delete name and delete address (node 814), delete name and de-identify address while preserving spatial proximity (node 815)). Children nodes 817, 818 of node 816 may each represent the set of configuration options of node 816 as well as respective sets of configuration options for a second attribute (e.g., de-identify name while preserving gender information and delete address (node 817), de-identify name while preserving gender information and de-identify address while preserving spatial proximity (node 817)).

Similarly, a node 832 of sub-tree 830 may represent a first set of configuration options for the second attribute (e.g., delete address), while node 836 may represent a second set of configuration options for the second attribute (e.g., de-identify address while preserving spatial proximity). Children nodes 834, 835 of node 832 may each represent the set of configuration options of node 832 as well as respective sets of configuration options for the first attribute (e.g., delete address and delete name (node 834), delete address and de-identify name while preserving gender information (node 835)). Children nodes 837, 838 of node 836 may each represent the set of configuration options of node 836 as well as respective sets of configuration options for the first attribute (e.g., de-identify address while preserving spatial proximity and delete name (node 837), de-identify address while preserving spatial proximity and de-identify name while preserving gender (node 838)). Nodes with overlapping (or the same) configuration options may be consolidated or pruned to produce a tree with each node having a different set of configuration options.

The children nodes of each parent node in tree 800 represent configuration options that produce datasets with more generalized information relative to their parent nodes. For example, node 812 may delete a name attribute, while a child node 814 may delete both the name and address attributes, thereby producing a dataset with less specific (or further de-identified) information. During processing, tree 800 is traversed from root node 805, and a corresponding template of a destination node is applied to the data de-identification process to generate a dataset. If the generated dataset is evaluated and determined to lack a privacy vulnerability, then the descendant nodes from the destination node are similarly considered to lack a privacy vulnerability since the descendant nodes are associated with configuration options producing more generalized datasets. Accordingly, the descendant nodes are indicated as allowable configurations for the data de-identification process without performing the evaluation, thereby reducing processing time.

For example, a template corresponding to node 812 may be applied to the data de-identification process to generate a dataset with the name attribute deleted. If this dataset is evaluated and determined to lack a privacy vulnerability, then any descendant nodes providing additional de-identification beyond the name deletion will also lack a privacy vulnerability (e.g., nodes 814, 815) since these nodes produce more generalized data (e.g., name deletion and address deletion (node 814), name deletion and address de-identification (node 815)). Accordingly, no additional processing is required to evaluate the dataset produced by the descendant nodes, thereby reducing processing time.

Tree 800 may be used to terminate processing of dataset generation and/or evaluation. The processing may be terminated for descendant nodes when a parent node is associated with an allowable set of configuration options generating a dataset with minimal or no privacy vulnerabilities as described above. For example, datasets for one or more data de-identification processes may be generated, and tree 800 may be utilized to minimize the quantity of generated datasets processed for faster evaluation of the generated datasets. In this case, when a parent node is associated with an allowable set of configuration options generating a dataset with minimal or no privacy vulnerabilities, the descendant nodes are considered allowable without further evaluation.

Alternatively, tree 800 may be utilized to generate and evaluate a dataset of one or a few nodes at a time for a de-identification process. This minimizes the quantity of times the de-identification process is executed to generate the dataset, and further minimizes the quantity of evaluations. In this case, when a parent node is associated with an allowable set of configuration options generating a dataset with minimal or no privacy vulnerabilities, the descendant nodes are considered allowable without generation of the dataset and further evaluation.

In addition, tree 800 may include sub-trees with higher level nodes for all or any portion of the attributes. Alternatively, each sub-tree may form a separate tree for evaluation of a de-identification process.

It will be appreciated that the embodiments described above and illustrated in the drawings represent only a few of the many ways of implementing embodiments for data de-identification based on detection of allowable configurations for data de-identification processes.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, evaluation module, data de-identification processes, etc.). These systems may include any types of monitors and input devices (e.g., keyboard, mouse, voice recognition, etc.) to enter and/or view information.

It is to be understood that the software (e.g., evaluation module, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., evaluation module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., original and interim datasets, configurations or settings, options for data de-identification processes, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., user preferences, recommended data de-identification processes, de-identified datasets, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., recommendations, privacy issues, etc.).

The present invention embodiments are not limited to the specific tasks or algorithms described above, but may be utilized for evaluating any data de-identification or anonymization processes or techniques for any types of identifiers. The data de-identification processes may be associated with any types of configuration options to delete or de-identify any attributes. The sets of configuration options and templates may specify any quantity of any configuration options for a data de-identification process.

The generated datasets may be evaluated in any manner to identify any quantity of any types of privacy vulnerabilities. The data of the generated datasets may be tested against any types of known or other datasets (e.g., user provided datasets, publicly available datasets, internal organization datasets, etc.). A generated dataset may be considered to be vulnerable in response to identification of any quantity of any types of privacy vulnerabilities (e.g., any quantity of entities identified, any quantity of quasi-identifiers introduced, etc.). The threshold for detecting a vulnerability may be set to any desired values (e.g., a quantity of links, a quantity of quasi-identifiers, a quantity of privacy vulnerabilities, etc.). The quantities may be compared to the threshold in any desired manner to indicate a privacy vulnerability (e.g., greater than, less than, greater than or equal to, less than or equal to, etc.).

Any data structure may be utilized to identify relationships between sets of configuration options (e.g., tree, hierarchical structure, etc.). Processing for any quantity of related configuration options may be terminated in response to an initial configuration generating a dataset with minimal or no privacy vulnerabilities. The data structure may be traversed in any fashion to evaluate the configuration options for a data de-identification process. Any quantity of data de-identification processes and associated sets of configuration options may be recommended or selected for a set of attributes. For example, the same or different data de-identification processes (and corresponding configurations) may be applied to different attributes in a dataset.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of de-identifying data comprising:
   determining one or more identifiers that identify an entity of a dataset;
   identifying one or more data de-identification processes associated with the determined one or more identifiers, wherein a plurality of sets of configuration options indicating information to preserve in the dataset are associated with the identified one or more data de-identification processes;
   executing, via a processor, the identified one or more data de-identification processes on the dataset in accordance with the associated sets of configuration options to generate datasets with varying preserved information;
   replacing two or more attributes of a generated dataset with intersecting information with a consolidated attribute, wherein the consolidated attribute includes information from an attribute of the two or more attributes having greater precision;
   evaluating, via a processor, the generated datasets for privacy vulnerabilities;
   selecting, via a processor, a data de-identification process and an associated set of configuration options producing a generated dataset lacking privacy vulnerabilities based on the evaluation; and
   executing, via a processor, the selected data de-identification process on the dataset according to the associated set of configuration options to produce a resulting de-identified dataset.

2. The method of claim 1, wherein determining the one or more identifiers further comprises:
   determining one or more direct identifiers, wherein the identified one or more data de-identification processes associated with the determined one or more identifiers include data masking processes.

3. The method of claim 1, wherein determining the one or more identifiers further comprises:
   determining a plurality of quasi-identifiers, wherein the identified one or more data de-identification processes associated with the determined one or more identifiers include data generalization or data suppression.

4. The method of claim 1, wherein the generated datasets are in the form of a table, and executing the identified one or more data de-identification processes further comprises:
   consolidating two or more columns of a first generated dataset to produce a column with information more specific than the two or more columns.

5. The method of claim 1, wherein evaluating the generated datasets for privacy vulnerabilities further comprises:
   determining a presence of a link between data for an entity in a first generated dataset and data for a known entity in a publicly available dataset to indicate a privacy vulnerability for the first generated dataset.

6. The method of claim 1, wherein evaluating the generated datasets for privacy vulnerabilities further comprises:
   determining a presence of a set of quasi-identifiers in a first generated dataset introduced by a corresponding data de-identification process and associated set of configuration options to indicate a privacy vulnerability for the first generated dataset.

7. The method of claim 1, further comprising:
   generating a series of templates for each data de-identification process, wherein each template specifies an associated set of configuration options for that data de-identification process.

8. The method of claim 1, further comprising:
   reducing processing time for the de-identification by determining a generated dataset lacking privacy vulnerabilities and terminating evaluation of at least one other associated set of configuration options for a corresponding data de-identification process generating one or more datasets with more generalized information than the determined generated dataset.

9. A system for de-identifying data comprising:
   at least one processor configured to:
   determine one or more identifiers that identify an entity of a dataset;
   identify one or more data de-identification processes associated with the determined one or more identifiers, wherein a plurality of sets of configuration options indicating information to preserve in the dataset are associated with the identified one or more data de-identification processes;
   execute the identified one or more data de-identification processes on the dataset in accordance with the associated sets of configuration options to generate datasets with varying preserved information;
   replace two or more attributes of a generated dataset with intersecting information with a consolidated attribute, wherein the consolidated attribute includes information from an attribute of the two or more attributes having greater precision;
   evaluate the generated datasets for privacy vulnerabilities;
   select a data de-identification process and an associated set of configuration options producing a generated dataset lacking privacy vulnerabilities based on the evaluation; and
   execute the selected data de-identification process on the dataset according to the associated set of configuration options to produce a resulting de-identified dataset.

10. The system of claim 9, wherein determining the one or more identifiers further comprises:
    determining one or more direct identifiers, wherein the identified one or more data de-identification processes associated with the determined one or more identifiers include data masking processes.

11. The system of claim 9, wherein determining the one or more identifiers further comprises:
    determining a plurality of quasi-identifiers, wherein the identified one or more data de-identification processes associated with the determined one or more identifiers include data generalization or data suppression.

12. The system of claim 9, wherein the generated datasets are in the form of a table, and executing the identified one or more data de-identification processes further comprises:
    consolidating two or more columns of a first generated dataset to produce a column with information more specific than the two or more columns.

13. The system of claim 9, wherein evaluating the generated datasets for privacy vulnerabilities further comprises:
determining a presence of a link between data for an entity in a first generated dataset and data for a known entity in a publicly available dataset to indicate a privacy vulnerability for the first generated dataset.

14. The system of claim 9, wherein evaluating the generated datasets for privacy vulnerabilities further comprises:
determining a presence of a set of quasi-identifiers in a first generated dataset introduced by a corresponding data de-identification process and associated set of configuration options to indicate a privacy vulnerability for the first generated dataset.

15. The system of claim 9, wherein the at least one processor is further configured to:
generate a series of templates for each data de-identification process, wherein each template specifies an associated set of configuration options for that data de-identification process.

16. The system of claim 9, wherein the at least one processor is further configured to:
reduce processing time for the de-identification by determining a generated dataset lacking privacy vulnerabilities and terminating evaluation of at least one other associated set of configuration options for a corresponding data de-identification process generating one or more datasets with more generalized information than the determined generated dataset.

17. A computer program product for de-identifying data, the computer program product comprising one or more computer readable storage media collectively having computer readable program code embodied therewith, the computer readable program code executable by at least one processor to cause the at least one processor to:
determine one or more identifiers that identify an entity of a dataset;
identify one or more data de-identification processes associated with the determined one or more identifiers, wherein a plurality of sets of configuration options indicating information to preserve in the dataset are associated with the identified one or more data de-identification processes;
execute the identified one or more data de-identification processes on the dataset in accordance with the associated sets of configuration options to generate datasets with varying preserved information;
replace two or more attributes of a generated dataset with intersecting information with a consolidated attribute, wherein the consolidated attribute includes information from an attribute of the two or more attributes having greater precision;
evaluate the generated datasets for privacy vulnerabilities;
select a data de-identification process and an associated set of configuration options producing a generated dataset lacking privacy vulnerabilities based on the evaluation; and
execute the selected data de-identification process on the dataset according to the associated set of configuration options to produce a resulting de-identified dataset.

18. The computer program product of claim 17, wherein determining the one or more identifiers further comprises:
determining one or more direct identifiers, and the identified one or more data de-identification processes associated with the determined one or more identifiers include data masking processes.

19. The computer program product of claim 17, wherein determining the one or more identifiers further comprises:
determining a plurality of quasi-identifiers, wherein the identified one or more data de-identification processes associated with the determined one or more identifiers include data generalization or data suppression.

20. The computer program product of claim 17, wherein the generated datasets are in the form of a table, and executing the identified one or more data de-identification processes further comprises:
consolidating two or more columns of a first generated dataset to produce a column with information more specific than the two or more columns.

21. The computer program product of claim 17, wherein evaluating the generated datasets for privacy vulnerabilities further comprises:
determining a presence of a link between data for an entity in a first generated dataset and data for a known entity in a publicly available dataset to indicate a privacy vulnerability for the first generated dataset.

22. The computer program product of claim 17, wherein evaluating the generated datasets for privacy vulnerabilities further comprises:
determining a presence of a set of quasi-identifiers in a first generated dataset introduced by a corresponding data de-identification process and associated set of configuration options to indicate a privacy vulnerability for the first generated dataset.

23. The computer program product of claim 17, wherein the computer readable program code further causes the at least one processor to:
generate a series of templates for each data de-identification process, wherein each template specifies an associated set of configuration options for that data de-identification process.

24. The computer program product of claim 17, wherein the computer readable program code further causes the at least one processor to:
reduce processing time for the de-identification by determining a generated dataset lacking privacy vulnerabilities and terminating evaluation of at least one other associated set of configuration options for a corresponding data de-identification process generating one or more datasets with more generalized information than the determined generated dataset.

\* \* \* \* \*